INVENTOR.
Theodore R. Drake
John L. Rados

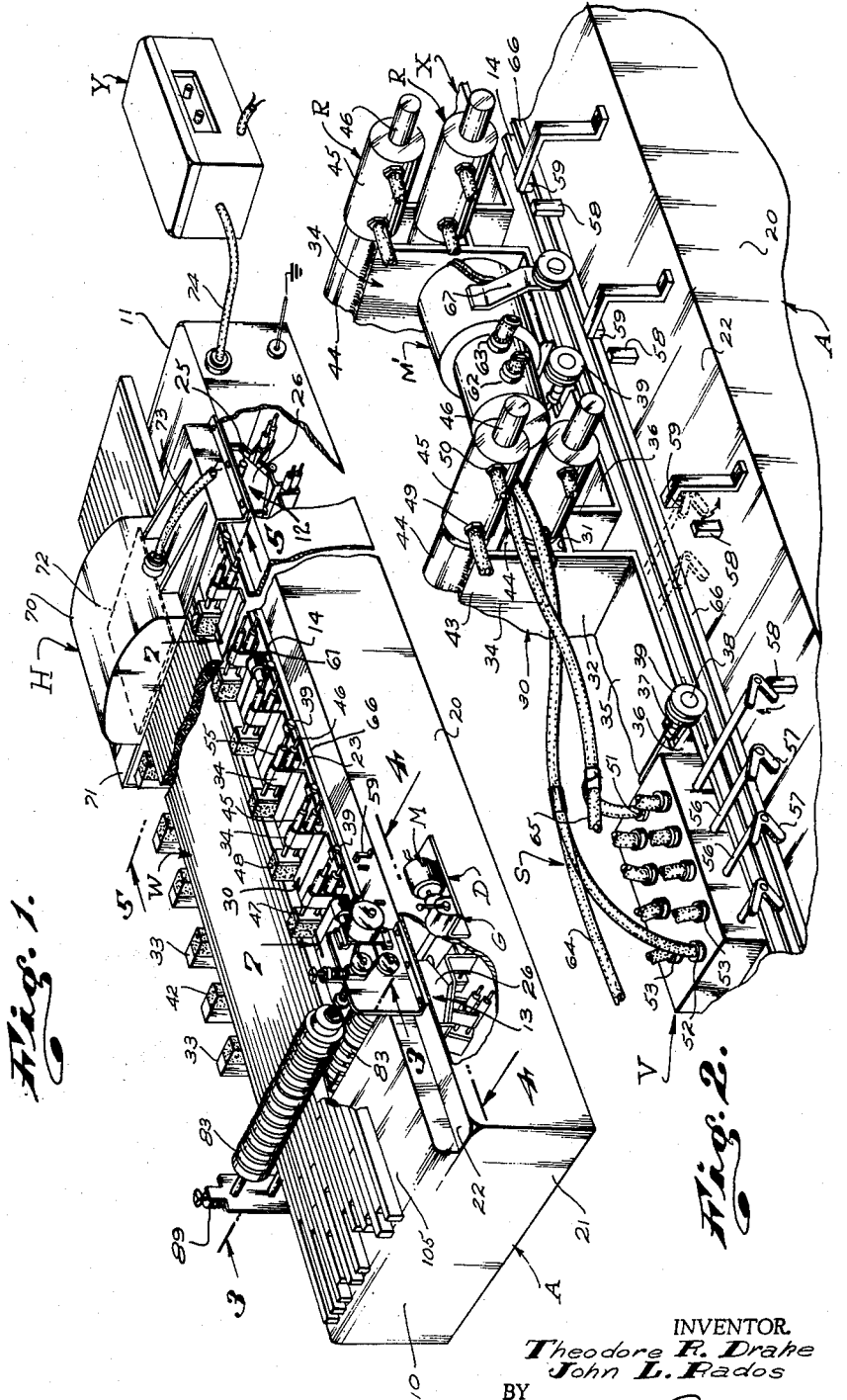

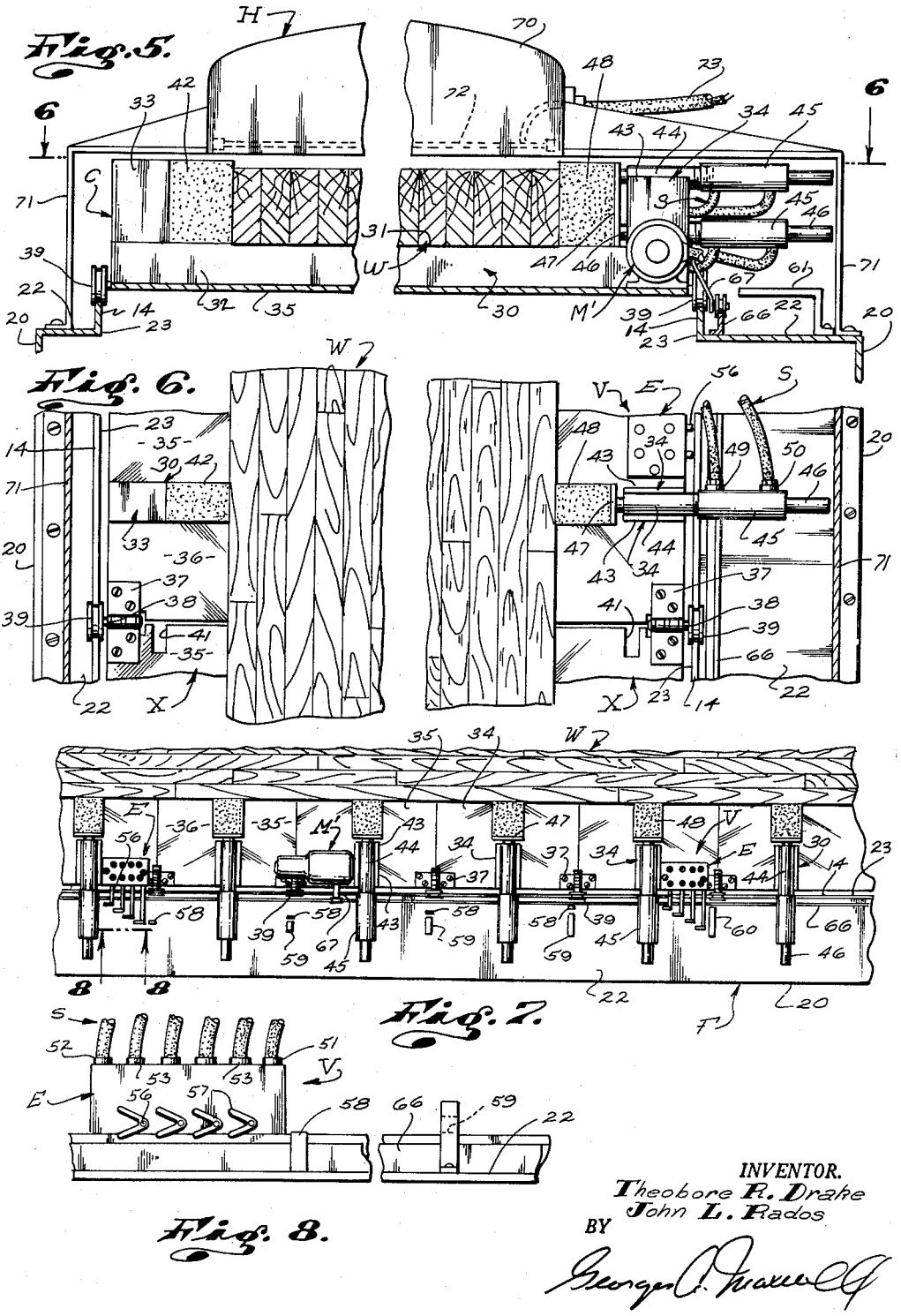

United States Patent Office 3,191,522
Patented June 29, 1965

3,191,522
CONTINUOUS PRESS
Theodore R. Drake, Seal Beach, and John L. Rados, San Pedro, Calif. (Both of P.O. Box 875, Wilmington, Calif.)
Filed Sept. 26, 1962, Ser. No. 226,235
5 Claims. (Cl. 100—93)

This invention relates to a press and is more particularly concerned with an improved fast-operating, continuous wood-laminating press.

For many years it has been common practice to establish large wooden beams or slabs of wood by laminating a plurality of small boards in side-by-side and end-to-end relationship. The boards are either scabbed together by suitable fastening means, such as nails, bolts and the like, glued together, or both. Such beams or slabs can be advantageously employed in many structures and are superior in many respects to structural steel and other materials.

In order to assure proper lamination of wood beams, it it necessary that the component boards be glued together and that adequate pressure be applied and maintained on the stack of boards while the glue is curing or drying, so as to assure a proper uniform, continuous bond.

It is common practice to apply such pressure by means of a plurality of separate, manually-operable mechanical clamping devices. This practice is extremely slow, it is not uniform, requires a great number of clamping devices, and a considerable number of persons to operate them, all to the end that such products are extremely costly to manufacture.

Still further, in the production of laminated wood beams, or slabs, in the manner set forth above, considerable skill is required in aligning and positioning the individual pieces of wood and necessitates the use of select lumber of considerable or standard lengths.

In following the conventional manner of producing such a product, the length of the beam or slab is, from a practical standpoint, limited. Each beam or slab must be especially built to specifications.

Throughout the world, there is a great quantity of lumber which, due to its short length, is considered of little value. Such lumber is commonly referred to as "shorts."

Each year many millions of board feet of lumber, in the form of shorts, is destroyed and wasted, or is sold at a much reduced price and as pulpwood. The use of shorts for producing laminated beams and the like has been often considered, but has always been rejected due to the increased labor cost in handling and manipulating such stock.

Attempts have been made to provide continuous wood laminating presses, that is, presses into which wood stock, coated or painted with a suitable glue, can be fed and which will discharge a continuous laminated wood product such as a beam or a slab. The principal difficulty to be overcome in such machines is to maintain the necessary or required pressure on the stack of lumber going to make up the beam, over a prolonged period of time so as to allow for setting and/or curing of the glue, and yet allow for continuous lineal movement of the stack of wood through the machine.

Past attempts to provide such machines have included longitudinal rows of vertically-spaced opposing pressure plates or platens between which the stack of wood is urged. Such constructions have proven unsatisfactory for several reasons. For example, when adequate pressure is exerted by the plates or platens upon the stack of wood, the frictional resistance becomes so great that the stack of wood cannot be urged between the plates without crushing and mutilating the ends of the stack upon which the driving pressure must be exerted and without galling the surfaces of the stack which oppose the plates. Further, such machines must necessarily be extremely heavy and costly of construction.

Attempts to overcome these problems have included the provisions of rollers in place of the platens. However, such attempts have proven unsatisfactory since rollers tend to crush the stock as it is advanced by them. Still other attempts which have proven to be of limited success in certain situations have involved the provision of pairs of endless belts or chains to occur at opposite sides of the stack of lumber or veneer and having plates carried thereby to engage the adjacent sides of the stack, and pressure means related to each chain and urging the chains and the plates thereon into pressure engagement with the stack of wood. The pressure means in such constructions is stationary, is of considerable longitudinal extent and requires that the stack of wood, with the chains and plates related thereto, be urged thereby. With these constructions, considerable force is required to shift the assembly between the pressure means. The pressure means in such constructions is inflexible longitudinally of the construction so that it is impossible to compensate for soft points along the longitudinal extent of the stack. That is, points which, due to soft boards, will compact more under the required pressure than the remainder of the stack.

Due to the fact that each piece of lumber of like grade and quality has its own unique resistance to being compacted and such resistance varies throughout the longitudinal extent thereof, and further, due to the fact that when several pieces of lumber are stacked and pressure is applied thereto as for the purpose of laminating the lumber, the extent to which the stack will compress or compact, at various points along its longitudinal extent, will vary widely.

Continuous presses which do not afford independent application of pressure at points along the longitudinal extent of the stack of lumber, and which do not allow for the maintenance of such pressure at such points uniformly for the required length of time cannot provide laminated wood product of uniform quality.

Another disadvantage in the above-noted procedure resides in the fact that in the absence of heat the glue requires many hours, oftentimes days, to dry and cure.

In the prior art the stack of wood in continuous presses has been heated to speed up drying and curing of the glue by constructing an oven or kiln in or about the press. While this has met with considerable success, it is still rather slow and costly since due to the natural insulating qualities of wood, considerable time is still required to raise the inside or core temperature of the stack of wood to a temperature where curing of the glue is assured.

The use of dielectric heaters has proven satisfactory in rapidly curing sheets of plywood and the like, in stationary presses, but has not, to applicants' knowledge, been successfully used in continuous presses due to the fact that such heating means requires the provision of a pair of spaced, insulated, electrodes between which the work being heated must be passed. Due to the tendency of such heating structures to arc out with any steel structure employed to carry or convey the work between the said electrodes, efforts to provide such heating structures on other than simple, plate conveyors has been avoided.

An object of our invention is to provide a novel continuous press adapted to receive and to simultaneously press and transport a stack of lumber which has been glued, for the purpose of establishing an elongate, continuous, laminated beam or slab.

Another object of the present invention is to provide a novel press of the character referred to, including longitudinally shiftable clamping means which engage and clamp lumber placed in the press in stacked relationship and maintain fixed clamping engagement with the stack of lumber as it travels and is advanced longitudinally through the press.

It is another object of this invention to provide a plurality of like, elongate, independently-operable clamping means arranged in longitudinal spaced relationship in the machine to extend transversely thereof and pivotally connected together in spaced parallel relationship to establish an endless chain-like series of clamps.

Still another object of the present invention is to provide means for supporting the endless series or chain of clamping means and for moving or turning said series longitudinally of the machine.

It is an object of this invention to provide a machine of the character referred to wherein each clamping means includes one or more hydraulic cylinder and ram units, control means for selectively energizing the cylinder and ram units into and out of engagement with the wood being worked upon and pumping means for supplying fluid under pressure to said cylinder and ram units.

An object of this invention is to provide novel feed means for engaging and feeding sticks of wood into engagement with the clamping means, whereby the adjacent ends of aligned sticks or boards are urged into and maintained in tight butted engagement and wherein the stack of wood is held and maintained in a flat, horizontal plane, at right angles to the plane in which the clamping means act so the stack will not bow or buckle under the force of the clamping means.

A further object of the present invention is to provide means for operating or actuating the clamping means which is such that each clamping means is actuated into engagement with the wood, out of engagement with the wood and again into engagement with the wood as the stack of wood enters the rear end of the machine and so as to unstress the stack of wood and prevent it from establishing a radius or bend therein as would occur if each successive clamping means was simply actuated into clamped engagement with the stack of wood as the stack advanced into the press.

A further object of our invention is to provide a press of the character referred to having a high frequency electric or dielectric heater construction incorporated therein to heat the stack of wood and cure the glue as the stack is advanced therethrough.

It is another object of this invetnion to provide a constuction of the character referred to wherein the chain established by the clamping means establishes one of the electrodes for the dielectric heater construction and is provided with insulating means to prevent the chain from arcing out with the other electrode of the heater construction.

The various objects and features of our invention will be fully understood from the following detailed description of a typical preferred form and application of our invention, throughout which description reference is made to the accompanying drawings, in which:

FIG. 1 is a perspective view of our new continuous press, certain portions being broken away and certain elements and/or parts not being shown, to better illustrate the construction;

FIG. 2 is an enlarged sectional view of a portion of the structure shown in FIG. 1;

FIG. 5 is a sectional view taken as indicated by line 5—5 on FIG. 1;

FIG. 6 is a view taken substantially as indicated by line 6—6 on FIG. 5;

FIG. 7 is a view of a portion of the construction taken substantially as indicated by line 7—7 on FIG. 1; and FIG. 8 is a view taken as indicated by line 8—8 on FIG. 7.

Figure 3:
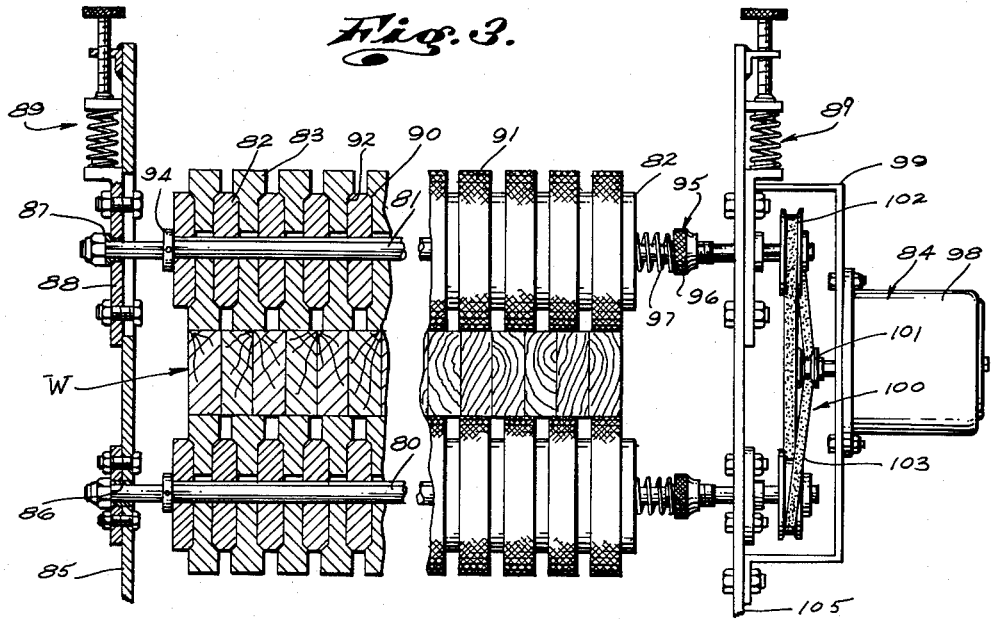
FIG. 3 is a sectional view of the feed means that we provide taken substantially as indicated by line 3—3 on FIG. 1.
Figure 4:
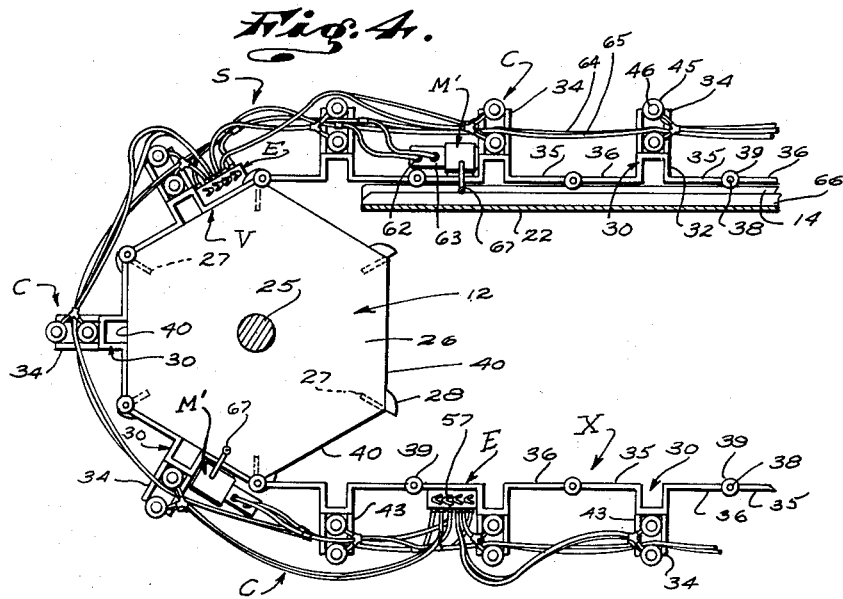
FIG. 4 is a sectional view taken substantially as indicated by line 4—4 on FIG. 1.

The continuous press that we provide is adapted to receive a plurality of boards of random lengths and suitably glued, in side-by-side and end-to-end relationship; to initially urge and hold the boards in a horizontal plane and in tight end-to-end relationship; to subsequently exert lateral, uniform clamping pressure on and through the stack of boards and to transport the said stack of boards longitudinally of the construction, thus clamped, at a predetermined rate. The press is further adapted to pass the stack through a high frequency electric field so as to heat the stack throughout and to set and cure the glue, and to then discharge the stock in the form of a unitary, continuous, laminated slab or beam.

The press or machine that we provide is designed to handle boards of standard cross-sectional dimensions, such as 2 x 4's or 2 x 6's and is such that boards of any length, such as shorts, can be advantageously handled. In practice, an especially constructed scarfing machine and a gluing apparatus are used in connection with the machine that we provide, to scarf the ends of the boards being used and to apply glue to the necessary surfaces thereof. Since these pieces of equipment are simply accessories and form no part of the instant invention, we will not burden this specification with further unnecessary consideration thereof.

The continuous press that we provide includes, generally, an elongate horizontally-disposed frame A, having front and rear ends 10 and 11, a hexagonal feed roller 12 at the rear end of the frame, a hexagonal discharge or return roller 13 at the forward end of the frame and a pair of laterally-spaced tracks 14 supported by the frame and extending longitudinally thereof, between the rollers 12 and 13, in a plane substantially tangential with the tops of the said rollers.

The press that we provide further includes a plurality of like clamping units C, arranged in longitudinal spaced relationship relative to the frame, to extend transversely thereof and pivotally connected to each other to establish an elongate endless clamp chain X, which chain is engaged about and extends between the rollers 12 and 13 and which is supported by the tracks 14, as clearly illustrated in the drawings.

Each clamping unit C includes one or more hydraulic cylinder and ram units supplied with fluid under pressure by a suitable fluid supply means S related to the chain X and which is under control of suitable valving means V, as will hereinafter be described.

Other means related to the basic set-up set forth above are provided and will be noted in the following.

The frame A that we provide is shown as a box-like structure formed of sheet or plate metal and is shown as having side walls 20, end walls 21 and a top 22. The top 22 has a rectangular opening 23 to accommodate the upper portions of the rollers 12 and 13 and the upper portion of the chain X made up of the clamping units C. The tracks 14 are established by upwardly-projecting flanges on the side edges of the opening 23 in the top 22 and serve to support the upper portion of the chain X extending between the rollers.

In practice, a second pair of tracks can be provided within the frame and between the rollers to support the lower portion of the chain X, however, since the provision of such secondary tracks may not be required, we have chosen not to illustrate them and will not burden this specification with further detailed description thereof.

The rollers 12 and 13 are like, elongate, horizontally-disposed structures and extend transversely of the frame between the side walls 20 thereof. Each roller includes an elongate central axle member 25, a pair of axially-spaced hexagonal discs 26, a plurality of elongate circumferentially-spaced spreaders 27 fixed to and extending between the discs and radially-outardly-projecting clamp-engaging dogs 28 on the discs and adapted to orient the chain with the rollers and to establish driving engagement therebetween.

The ends of the axle members 25 are rotatably supported in suitable bearings, not shown, on the side walls 20 of the frame A.

A suitable drive means D, including an electric motor M and a reduction gear G is mounted on the outer side of one side wall 20, at the rear portion of the frame to drive the roller 12, as clearly illustrated in FIG. 1 of the drawings.

The reduciton gear G is a variable speed reduction gear and is such that the rate at which the roller 12 is driven can be varied, as circumstances require.

With the above construction it will be apparent that the feed roller 12 is driven and serves to drive the chain X and to advance the stack of wood being handled, longitudinally forwardly through the press.

The plurality of clamping units C going to make up the clamp chain X are alike and each includes an elongate, horizontally-disposed U-shaped beam extending transverse the longitudinal axis of the frame. Each U-shaped beam 30 is shown as having a flat upwardly-disposed work-supporting top 31, vertical sides 32 depending from the side edges of the said top, upwardly-projecting heads 33 and 34 at the opposite ends of the said top and laterally-projecting, horizontally-disposed, front and rear flanges 35 and 36 projecting from the lower edges of the sides, as clearly illustrated in the drawings.

The front and rear flanges 35 and 36 of adjacent clamping units C have straight opposing edges and are pivotally connected together by means of suitable butt hinges 37 at the opposite ends of the beams.

The hinges 37 have pivot pins 38 which pins project axially outwardly from the ends of the beams to establish axle members on which grooved, track-engaging rollers 39 are rotatably engaged.

The overall lateral extent of the beams 30, that is, the distance between the edges of the front and rear flanges thereof, is equal with the lineal extent of the flats or sides 40 of the hexagonal discs 26 of the rollers 12 and 13. With this relationship of parts it will be apparent that the beams, like links, making up the chain X, and that the chain cooperates or meshes with the discs of the rollers 12 and 13 when the construction is operated.

The flange 35 of each beam 30 is provided with a pair of laterally-spaced notches 41 in its leading edge, to occur in alignment with the discs 26 of the rollers 12 and 13 and to cooperatively receive the dogs 28 on the rollers. The dogs engage and establish driving and orienting engagement on the rear or trailing edge of the next forward, or adjacent flange 36.

With the above construction, it will be apparent that the chain X is suitably supported in the frame and about the rollers for rotation and so that the upper portion of the chain X, occurring in the opening 23 of the frame A, establishes a suitable, upwardly-disposed support or conveyor structure for supporting and transporting a stack of wood W, longitudinally of the construction.

The heads 33 at the left-hand ends of the beams 30, looking forwardly, are in the nature of simple box-like metal structures welded to the tops of the beams to project upwardly therefrom and define stops to engage and prevent lateral displacement of work supported by the beams.

The heads 33 further include insulating pressure blocks 42, formed of wood or other suitable dielectric material at their inner sides, to engage the stack of wood and to maintain the metal, box-like heads in spaced relationship from an electrode of the high frequency heating means, as will hereinafter be described.

The heads 34 occurring at the other or righthand ends of the beams are established by a pair of laterally-spaced upwardly-projecting plates 43 fixed to the ends of the beams as by welding and one or more vertically-spaced, horizontally-disposed mounting tubes 44 arranged between the plates 43 and welded thereto. The central axes of the tubes 44 are parallel with the longitudinal axes of the beams. The outer ends of the tubes project laterally-outwardly from the plates 43, and the ends of the beams, and are suitably threaded to cooperatively receive and mount the cylinders 45 of hydraulic ram units R.

The cylinders of the units R project laterally outwardly from the heads 34 and carry rams 46 which rams extend through the tubes 44 to project laterally inwardly of the heads, where they connect with and carry suitable pressure plates 47, as clearly illustrated in the drawings.

The plates 47 carry or are provided with laterally-inwardly-projecting work-engaging insulating pressure blocks 48 similar to the blocks 42 carried by the heads 33.

The cylinder and ram units R are double-acting units, the cylinders 45 being provided with a pair of longitudinally-spaced fittings 49 and 50 to connect with suitable fluid conducting hoses related to the valving means V, as will hereinafter be described.

From the foregoing, it will be apparent that each clamp unit is in effect an elongate, normally-upwardly-opening, hydraulically-operated C-clamp and that the chain X is, in effect, an endless series of C-clamps pivotally connected together in side-by-side relationship.

When the cylinder and ram units occur at the top of the chain X where they are supported by the tracks 14, they are energized to exert pressure on the stack of wood W. When the said units occur adjacent the rollers 12 and 13 at each end of the frame, and at the bottom side of the chain, the cylinder and ram units are reversed or energized to shift out of engagement with the stack of wood.

Since the exact nature and design of the cylinder and piston units related to each clamp unit can vary widely without affecting the novelty of this invention, we will not burden this specification with further unnecessary detailed illustration and description thereof.

The valving means V that we provide is shown as including a plurality of distributor blocks E fixed to and carried by the chain X at spaced intervals. Each block E has a fluid inlet fitting 51 and a fluid outlet fitting 52 and four pairs of delivery fittings 53, each under control of a suitable valving mechanism and with which the lines connected with the cylinders 45 are connected. The valving mechanisms are individually mechanically actuated to selectively establish communication between the inlet fitting and one of the delivery fittings and communication between the outlet fitting and the other delivery fitting of each pair of said delivery fittings.

With the above set-up, it will be apparent that by actuating the valve mechanism related to each cylinder, fluid under pressure can be selectively introduced into either end of the cylinder and exhausted from the other end so as to shift the ram 46 with the plate 47 and block 48 related thereto into and out of engagement with the stack of wood W.

Each distributor block E, having four pairs of delivery fittings 53, is capable of delivering and receiving fluid from four clamping units C. In the case illustrated the flange 35 of every fourth clamping unit C carries a distributor block E. The blocks E are shown as simple, substantially cubicle structures and are supported or mounted on the flanges 35 of the beams 30 with which they are related to occur laterally-outwardly of the work-receiving space defined by the beam and below the plane of the top 31 of the said beam.

The valving mechanism related to each pair of delivery ports includes an elongate stem 56 which projects laterally outwardly from the block E to overlie the adjacent top 22 of the frame A. Each stem 56 is provided with a suitable bell crank-type rocker 57 at its outer end. The stems 56 of each block E are of varying lengths so that the rockers 57 fixed to the ends thereof occur in and travel along laterally-spaced vertical planes with respect to the longitudinal axis of the construction.

Mounted on the rear end of the top 22 of the frame A, at the right-hand side of the opening 23 therein, are a plurality of longitudinally and laterally spaced, upwardly-projecting primary actuating lugs 58. The lugs are adapted to selectively engage and rotate the rockers 57 of the valving mechanisms, as the blocks advance thereby, to actuate the cylinders and rams of each clamping unit C and exert pressure on the stack of wood W, when each clamping unit has advanced beyond or forward of the feed roller 12 and is supported by the track 14. Also mounted at the front end of the top 22 of the frame is a similar group of secondary actuating lugs 59 which serve to engage the rockers 57 to actuate the cylinder and ram units of each unit C to release the pressure exerted on the wood and to shift the pressure plates and blocks thereof away from the wood when each clamping unit reaches a predetermined position at the rear portion of the press. Finally, there is a third actuating lug 60 at the said rear end of the frame to engage the rockers 57 and to reactuate the units into tight clamped engagement with the wood.

The primary lugs 58 actuate each clamping unit into clamped engagement with the wood as it initially reaches clamping position in the construction, the secondary lugs 59 actuate the units out of clamping engagement with the wood when the next trailing clamping unit reaches its clamping position and is actuated into clamping engagement with the wood. The third lug 60 actuates each of the clamping units into tight clamping engagement with the wood when the fourth trailing clamping unit is actuated by the primary lug 58.

With the above relationship of parts, it will be apparent that as the stack of wood W is advanced into and through the press, the stack, at each clamping point along its longitudinal extent, is first pressed, then released and then pressed again. By so working the stack of wood the stack is allowed to work before being finally clamped or pressed so as to remove lateral stresses therein which would otherwise cause the stack to develop a radius or curve throughout its longitudinal extent.

At the forward end of the frame a fourth lug 61 is provided, which lug engages the rockers 57 of each clamping unit and actuates each clamping unit out of engagement with the stack of wood W just prior to each unit leaving the track 14 and advancing forwardly and downwardly over the roller 13.

In practice, the valving means V and the means employed to operate it can vary widely in form, without in any way affecting the novelty of the invention. For instance, separate valving means could be related to each cylinder 45 and could be under control of any suitable mechanical or electrical operating means.

Since the particular valving means V and controls therefor can vary widely in form and construction, further consideration of the particular means shown will not be undertaken.

The fluid supply means S includes a plurality of like motor pumps M′ carried by the chain X, each having discharge and return fittings 62 and 63. The motor pumps are arranged in spaced relationship about the circumferential extent of the chain X. A continuous supply hose 64, coextensive with the circumferential extent of the chain X and connected with the discharge fittings of the several pumps and with the inlet fittings of the several distributor blocks, is provided to conduct fluid to the several valving means. A continuous return hose 65, coextensive with the circumferential extent of the chain X and connected with the return fittings 63 of the several motor pumps and with the outlet fittings of the several distributor blocks, is provided to conduct fluid from the valving means back to the pumps (see FIG. 2).

The motor pumps M′ are supplied with current through an electrically energized rail 66 carried by the top 22 of the frame A, laterally-outwardly of the right-hand track 14 and a trolley 67 carried by each motor pump, which trolley engages the rail 66 as the said motor pump travels forwardly.

In practice, it is necessary that at least one motor pump be energized at all times. Accordingly, it is necessary that there be at least three such pumps spaced circumferentially about the chain X.

The several motor pumps, like the distributor blocks E, are mounted on and carried by the flanges 35 on the beams 30 of the clamping means C with which they are related.

In practice, if it is desired or found necessary, fluid and/or pressure accumulators can be provided in the hose 64 and/or 65. Such accumulators can be simple tank-like units and, like the distributor blocks and the motor pumps, can be mounted on the flanges of certain of the clamping unit beams 30.

In addition to the foregoing, our new construction further includes a high frequency or dielectric heater means H to heat the stack of wood W throughout its entire cross-sectional extent and to thereby set and cure the glue.

The heater means H includes a downwardly-opening box-like housing 70 supported in spaced relationship above the forward portion of the frame A by a pair of laterally-spaced insulating mounting members 71 fixed to the top 22 of the frame, and a metallic grid-type electrode 72 mounted within the housing and occurring in predetermined spaced relationship above the stack of wood. A lead 73 extends from the electrode 72 to one terminal of a suitable high frequency electric generator, indicated diagrammatically at Y in FIGURE 1 of the drawings.

The chain X serves as the second or lower electrode for the high frequency heater means and is connected with the other terminal of the generator by a lead 74, which lead connects with the frame A, which frame, being metal and a suitable conductor, is in direct contact with the chain at all times.

The frame A, resting upon the ground, is suitably earthed or grounded so that persons working about the construction are not subject to being shocked.

The electrode 72 is equal in lateral extent with the stack of wood and the insulating blocks 42 on the heads 33 and the blocks 48 on the pressure plates 47 serve to maintain the heads 33 and the pressure plates 47 in insulated spaced relationship from the electrode 72 and thereby prevent arcing out of the heater construction.

With the heater means H set forth above, it will be apparent that the stack of wood W is heated and the glue is cured and set before the stack of wood is finally released by the clamping means and before the laminated slab or beam leaves the forward or discharge end of the construction.

In order to assure that the sticks or pieces of wood going to make up the slab are in tight end-to-end relationship and to assure that they are in and remain in horizontal alignment, we provide a novel feed means I at the rear or inlet end of the frame A, rearward of the roller 12. The means I includes a pair of vertically-spaced, horizontally-disposed shafts 80 and 81, extending transverse the forward end portion of the frame, a plurality of axially-spaced friction discs 82 carried by each shaft, a plurality of work-engaging rollers 83 carried by the discs 82 and establishing frictional driving engagement therewith and drive means 84 driving the shafts, discs, and rollers so as to urge the boards engaged by the rollers forwardly into tight end-to-end engagement with the next adjacent or forward boards going to make up the stack of wood W in the press. The shafts are supported at their ends by a pair of laterally-spaced upwardly-projecting plates 85 on the top 22 of the frame. The ends of the lower shaft 80 are supported on the plates 85 through or by means of suitable bearings 86. The ends of the upper shaft 81 are rotatably supported in suitable bearings 87, which bearings are carried by vertically-shiftable carriages 88 mounted on the plates, as clearly illustrated in FIG. 3 of the drawings. The carriages 88 are normally yieldingly urged downwardly by manually adjustable spring means 89 carried by the plate, above the carriages.

The discs 82 are keyed to the shafts to establish rotary driving engagement therewith and so that they are shiftable axially thereon. The outer edges of the discs are chamfered to establish angular axially and radially-outwardly-disposed inclined bearing surfaces 90 at each side of the discs.

The work-engaging rollers 83 are annular members, greater in radial and axial extent that the discs, and have straight annular, outer work-engaging surfaces 91, axially outwardly and radially-inwardly disposed inclined bearing surfaces 92 at each side thereof and radially-inwardly projecting flanges between the said surfaces 92.

The discs and rollers on each shaft are arranged in alternate series with the flange of each roller occurring between pairs of adjacent discs and with the adjacent bearing surfaces 90 and 92 of the adjacent discs and rollers establishing sliding bearing engagement with each other. The said surfaces 90 and 92 serve to maintain the rollers in axial alignment with the shafts.

A stop 94 is provided on each shaft at one end of the series of discs and rollers thereon. An adjustable spring means 95 is provided on each shaft adjacent the other end of the series of discs and rollers thereon to normally yieldingly urge the said series of discs and rollers into frictional bearing engagement with each other and towards the stop. The means 95 is shown as including follower nuts 96 threadedly engaged on the shafts and compression springs 97 between the said nuts and the adjacent end discs 82.

With the means 95 set forth above, it will be apparent that the frictional resistance between the discs and the rollers can be varied as circumstances require. Further, with the adjustable spring means 89 carried by the plates and acting upon the carriages 87, it will be apparent that the pressure exerted by the upper series of rollers on the stack of wood can be advantageously adjusted and varied as circumstances require.

The drive means 84 includes an electric motor 98 fixed to one of the plates 85 by a suitable mounting bracket 99 and a suitable transmission 100 between the motor and the adjacent ends of the shafts to drive the shafts in opposite directions, whereby the rollers engaging the wood introduced between the said rollers serve to drive the wood forwardly.

In the case illustrated, we have shown the transmission 100 including a sheave 101 on the output shaft of the motor, sheaves 102 on the adjacent ends of the shafts and a belt 103 engaged above the several sheaves so as to obtain the desired drive.

The outer surfaces 91 of the work-engaging rollers are knurled and the rollers are driven at a greater lineal speed than the chain X of the press. As a result of the above, the rollers are constantly overriding on the wood and the individual pieces of wood engaged between the rollers are constantly being driven forwardly into tight engagement in or with the stack of wood W engaged by the clamping means C.

In practice, the tops of the rollers 83 engaging the lower sides of the boards are tangential with the work-supporting tops 31 of the beams 30, and the rear end of the frame A is provided with a flat, horizontally-disposed platform 105 rearward of the feed means, which platform is on a plane substantially tangential with the tops of the lower rollers and of the beams. With this relationship of parts, it will be apparent that wood being fed into the press is first arranged and is on and is supported in a horizontal plane by the platform 105. The wood thus oriented is engaged and advanced forwardly by the feed means into engagement with the stack of wood W engaged by the chain X, throughout which operation it is not shifted out of alignment from the said horizontal plane in which it was initially arranged. The upper rollers 83 of the feed means exerts pressure downwardly on the boards engaged thereby and serves to maintain the boards in the desired plane and until they are engaged by the clamp means C of the chain X, after which they are prevented from becoming misaligned by the pressures exerted by the said clamping means.

With the construction provided by the present invention, it will be apparent that by feeding suitably glued boards, of any desired and varying lengths, into the rear end of our new press, a continuous, uniform, laminated beam or slab, of indefinite length can be advantageously and economically produced.

Having described only a typical preferred form and application of our invention, we do not wish to be limited or restricted to the specific details herein set forth, but wish to reserve to ourselves any variations or modifications that may appear to those skilled in the art and fall within the scope of the following claims.

Having described our invention, we claim:

1. A continuous press of the character referred to, including an elongate horizontally disposed frame having front and rear ends, an elongate horizontally disposed feed roller rotatably supported at the rear end of the frame and extending transversely thereof, an elongate horizontally disposed return roller rotatably supported at the forward end of the frame and extending transversely thereof, an endless clamp chain engaged about and extending between the rollers to define a lower portion of the chain and an upper work supporting portion thereof, drive means rotating one of said rollers continuously in one direction whereby the upper portion of the chain is moved longitudinally forward of the frame, horizontal tracks extending longitudinally of the frame between the rollers to support the chain, said clamp chain including a plurality of like elongate C clamps arranged in spaced parallel relationship and extending transverse the axis of the frame, each C clamp having an elongate, horizontally disposed work supporting beam, outwardly projecting heads at the ends of the beam to occur at opposite sides of work supported by the beam, a horizontally disposed hydraulic cylinder and ram unit carried by one head and operable to urge work into clamped engagement against the other head, hinge means fixed to and pivotally connecting adjacent clamp members in side by side relationship, support rollers on the chain and engaging the tracks, fluid pressure supply means carried by the clamp chain and valving means carried by the clamp chain and related to the fluid supply means and the ram units and operable to shift the rams laterally inwardly into engagement with work supported by the chain when they disengage the feed roller and occur at the upper portion of the chain, to next shift the rams out of and back into engagement with work as work is advanced into engagement in the press and to then shift the rams laterally outwardly when they occur adjacent the forward return roller, said valving means including a plurality of longitudinally spaced projections on the frame adjacent the chain and operating levers projecting from the chain to engage the projections as the chain moves longitudinally.

2. A continuous press of the character referred to including, an elongate horizontally disposed frame having front and rear ends, an elongate horizontally disposed feed roller rotatably supported at the rear end of the frame and extending transversely thereof, an elongate horizontally disposed return roller rotatably supported at the forward end of the frame and extending transversely thereof, an enless clamp chain engaged about and extending between said rollers to define a lower portion and an upper work supporting portion, drive means rotating one of said rollers whereby the upper portion of the clamp chain is moved longitudinally forward in the frame, said clamp chain including a plurality of like horizontally disposed elongate C clamps arranged in spaced parallel relationship and extending transversely of the frame, each C clamp having an elongate horizontally disposed work supporting beam, outwardly projecting heads at the ends of the beam and at right angles thereto, a horizontally disposed hydraulic ram unit carried by one head and having a work engaging pressure plate opposing the other head, hinge means pivotally connecting the adjacent C clamps in side by side relationship, said frame having a pair of laterally spaced longitudinally extending tracks between the front and rear portions thereof and adjacent each side and below the upper portion of the clamp chain, said hinge means pivotally connecting adjacent C clamps carrying supporting wheels to engage the tracks, fluid pressure supply means carried by the clamp chain and valving means carried by the clamp chain and related to said fluid supply means and the ram units and operable to shift the rams laterally inwardly, then laterally outwardly and then laterally inwardly again when they occur at the upper rear portion of the chain and between the rollers and to shift the rams laterally outwardly when they occur at the forward end portion of the chain adjacent the return roller, said fluid pressure supply means including a plurality of electric pumps having inlet and outlet fittings carried by the clamp chain in circumferential spaced relationship, endless delivery and return ducts carried by the clamp chain and connected with the outlet and inlet fittings, each ram unit including an elongate cylinder having inlet and outlet fittings, said valve means including a two-way valve related to each ram and connected with the delivery and return ducts and with the inlet and outlet fittings of the ram units, said valve means having operating stems engageable with parts on the frame whereby the valve is actuated to effect operation of the ram related thereto.

3. A continuous press of the character referred to including, an elongate horizontally disposed frame having front and rear ends, an elongate horizontally disposed feed roller rotatably supported at the rear end of the frame and extending transversely thereof, an elongate horizontally disposed return roller rotatably supported at the forward end of the frame and extending transversely thereof, an endless clamp chain engaged about and extending between said rollers to define a lower portion and an upper work supporting portion, drive means rotating one of said rollers whereby the upper portion of the clamp chain is moved longitudinally forward in the frame, said clamp chain including a plurality of like horizontally disposed elongate C clamps arranged in spaced parallel relationship and extending transversely of the frame, each C clamp having an elongate horizontally disposed work supporting beam, outwardly projecting heads at the ends of the beam and at right angles thereto, a horizontally disposed hydraulic ram unit carried by one head and having a work engaging pressure plate opposing the other head, hinge means pivotally connecting the adjacent C clamps in side by side relationship, said frame having a pair of laterally spaced longitudinally extending tracks between the front and rear portions thereof and adjacent each side and below the upper portion of the clamp chain, said hinge means pivotally connecting adjacent C clamps carrying supporting wheels to engage the tracks, a dielectric heating means for heating a stack of glued wood engaged by the upper portion of the chain and to cure the glue including, a high frequency electric generator with a pair of terminals, a lead extending from one terminal to the frame to conduct current between the chain carried by the frame and the generator, a platelike electrode arranged in horizontal spaced relationship above the stack of wood and insulated from the frame, a lead extending from the electrode to the other terminal and a line extending from the ground to the frame, said pressure plates and said heads opposing the pressure plates having insulating wood engaging blocks to maintain the said heads and pressure plates in insulated spaced relationship from the electrode.

4. A continuous press of the character referred to including, an elongate horizontally disposed frame having front and rear ends, an elongate horizontally disposed feed roller rotatably supported at the rear end of the frame and extending transversely thereof, an elongate horizontally disposed return roller rotatably supported at the forward end of the frame and extending transversely thereof, an endless clamp chain engaged about and extending between the rollers to define a lower portion of the chain and an upper work supporting portion thereof, drive means rotating one of said rollers continuously in one direction whereby the upper portion of the chain is moved longitudinally forward of the frame, horizontal tracks extending longitudinally of the frame between the rollers to support the chain, said clamp chain including a plurality of like elongate C clamps arranged in spaced parallel relationship and extending transverse the axis of the frame, each C clamp having an elongate, horizontally disposed work supporting beam, outwardly projecting heads at the ends of the beam to occur at opposite sides of work supported by the beam, a horizontally disposed hydraulic cylinder and ram unit carried by one head and operable to urge work into clamped engagement against the other head, hinge means fixed to and pivotally connecting adjacent clamp members in side by side relationship, support rollers on the chain and engaging the tracks, feed means at the rear end of the frame to receive a plurality of laterally spaced boards and to hold said plurality of boards in a horizontal plane and to urge each board forwardly into tight engagement with the trailing ends of boards engaged by the chain, said means including a lower shaft rotatably supported on a fixed horizontal axis extending transverse the frame, a plurality of axially spaced rollers to engage the bottom of the boards surrounding the shaft and frictional drive means between said shaft and said rollers, an upper shaft rotatably supported on a horizontal axis above the lower shaft and vertically shiftable relative thereto, adjustable spring means normally yielding urging the upper shaft downwardly, a plurality of axially spaced rollers to engage the tops of the boards surrounding the upper shaft and frictional drive means between the upper shaft and the rollers related thereto, and drive means for said shafts whereby the upper periphery of the rollers on the lower shaft and the lower peripheries of the rollers on the upper shaft travel in the direction of and at a lineal rate in excess of the direction and rate of travel of the wood engaged in the press.

5. A continuous press of the character referred to including, an elongate horizontally disposed frame having front and rear ends, an elongate horizontally disposed feed roller rotatably supported at the rear end of the frame and extending transversely thereof, an elongate horizontally disposed return roller rotatably supported at the forward end of the frame and extending transversely thereof, an endless clamp chain engaged about and extending between said rollers to define a lower portion and an upper work supporting portion, drive means rotating one of said rollers whereby the upper portion of the clamp chain is moved longitudinally forward in the frame, said clamp chain including a plurality of like horizontally disposed elongate C clamps arranged in spaced parallel relationship and extending transversely of the frame, each C clamp having an elongate horizontally disposed work supporting beam, outwardly projecting heads at the ends of the beam and at right angles thereto, a horizontally disposed hydraulic ram unit carried by one head and having a work engaging pressure plate opposing the other head, hinge means pivotally connecting the adjacent C clamps in side by side relationship, said frame having a pair of laterally spaced longitudinally extending tracks between the front and rear portions thereof and adjacent each side and below the upper portion of the clamp chain, said hinge means pivotally connecting adjacent C clamps carrying supporting wheels to engage the tracks, feed means at the rear end of the frame to receive a plurality of laterally spaced glued boards and to hold said plurality of glued boards in a flat horizontal plane and to urge each board forwardly into tight engagement with the trailing ends of boards engaged by the chain, said feed means including a lower shaft rotatably supported on a fixed horizontal axis extending transverse the frame, a plurality of axially spaced rollers to engage the bottom of the boards frictionally engaged on the lower shaft, an upper shaft rotatably supported on a horizontal axis above the lower shaft and shiftable vertically relative thereto, spring means normally yielding urging the upper shaft downwardly relative to the lower shaft, a plurality of axially spaced rollers to engage the tops of the boards frictionally engaged on said upper shaft and drive means for said shafts whereby the upper periphery of the rollers on the lower shaft and the lower peripheries of the rollers on the upper shaft travel in the direction of and at a lineal rate in excess of the direction and rate of travel of the wood engaged in the press, and a dielectric heating means for heating the wood engaged in the press and to cure the glue including a high frequency electric generator with a pair of terminals, a lead extending from one terminal to the frame to conduct current between the chain carried by the frame and the generator, a platelike electrode arranged in predetermined spaced relationship above the wood in the press and insulated from the frame, a lead extending from the electrode to the other terminal and a line extending from the ground to the frame.

References Cited by the Examiner

UNITED STATES PATENTS

| | | | |
|---|---|---|---|
| 1,052,403 | 2/13 | Becker | 144—250 |
| 2,307,344 | 1/43 | Zottu | 156—273 X |
| 2,527,342 | 10/50 | Frisch | 144—281 |
| 2,545,370 | 3/51 | Mittelmann | 156—273 X |
| 2,708,649 | 5/55 | Cunningham | 156—380 X |
| 2,892,535 | 6/59 | Cullen et al. | 226—173 |
| 2,998,501 | 8/61 | Edberg et al. | 156—380 X |
| 3,098,514 | 7/63 | Rado et al. | 144—281.2 |

FOREIGN PATENTS 827,723 1/52 Germany.

WALTER A. SCHEEL, *Primary Examiner.*

CHARLES A. WILLMUTH, L. O. MAASSEL, *Examiners.*